United States Patent [19]

Wiechmann et al.

[11] Patent Number: 4,826,521
[45] Date of Patent: May 2, 1989

[54] METHOD OF MANUFACTURING ARTICLES OF EXTREMELY PURE SYNTHETIC PARTICULATE SILICON DIOXIDE

[75] Inventors: Uwe Wiechmann, Hanau; Andreas Schultheis, Fulda, both of Fed. Rep. of Germany

[73] Assignee: Heraeus Quarzschmelze GmbH, Hanau, Fed. Rep. of Germany

[21] Appl. No.: 160,726

[22] Filed: Feb. 26, 1988

Related U.S. Application Data

[63] Continuation of Ser. No. 884,588, Jul. 11, 1986, abandoned.

[30] Foreign Application Priority Data

Jul. 17, 1985 [DE] Fed. Rep. of Germany ....... 3525495

[51] Int. Cl.$^4$ ............ C03B 23/20; C03C 27/00; C03C 29/00; C01B 33/12
[52] U.S. Cl. .............................. 65/18.1; 65/901; 423/338; 501/4; 501/12
[58] Field of Search .............. 423/338; 501/4, 12; 65/3.12, 901, 18.1

[56] References Cited

U.S. PATENT DOCUMENTS

| | | |
|---|---|---|
| 3,959,174 | 5/1976 | Winyall et al. ............. 423/338 |
| 4,228,260 | 10/1980 | Scholten et al. ............. 423/338 |
| 4,228,261 | 10/1980 | Scholten et al. ............. 423/338 |
| 4,278,632 | 7/1981 | Yoldas ............................ 264/66 |
| 4,368,846 | 1/1983 | Rau et al. ..................... 65/18.2 |
| 4,572,729 | 2/1986 | Lang et al. .................... 65/18.1 |

FOREIGN PATENT DOCUMENTS 0053298  9/1973  Japan ................................. 423/338
51-40797  4/1976  Japan ................................. 423/338

OTHER PUBLICATIONS

Abstract of Japanese Patent '797, 4/27/76.

Primary Examiner—Robert L. Stoll
Assistant Examiner—Lori S. Freeman
Attorney, Agent, or Firm—Sprung Horn Kramer & Woods

[57] ABSTRACT

In the production of an article of extremely pure synthetic silicon dioxide, wherein silicon tetrachloride is mixed with water to effect hydrolysis, the resulting hydrolysis product is dried, and the resulting dried particulate product is further processed into the desired article, the improvement which comprises employing a ratio of silicon tetrachloride to water so that the hydrolysis product is in the form of a gel, distilling by-product hydrochloric acid out of the gel, preliminarily drying the gel at 100° to 1000° C. to produce an initial product, milling the initial product into a fine granulate at room temperature, separating from the milled granulate a fraction with a particle size of about 40 to 1000 μm, and drying the screened-out granulate fraction while slowly heating to no more than 1400° C. to form the resulting dried particulate product that is further processed into the desired article. As a result, high quality bubble free articles are produced.

12 Claims, 2 Drawing Sheets

METHOD OF MANUFACTURING ARTICLES OF EXTREMELY PURE SYNTHETIC PARTICULATE SILICON DIOXIDE

BACKGROUND OF THE INVENTION

This is a continuation of application Ser. No. 884,588, filed Jul. 11, 1986, abandoned.

The present invention relates to a method of manufacturing articles of extremely pure synthetic particulate silicon dioxide.

A method of manufacturing articles of extremely pure synthetic particulate silicon dioxide is known from U.S. Pat. No. 4,572,729. The starting products are extremely pure silicon tetrachloride and extremely pure water. The silicon tetrachloride can be hydrolyzed by introducing it into an excess of water. The starting products are added to each other while being stirred. Hydrolysis can be carried out at temperatures ranging from room temperature to the boiling point. The hydrolysis product is separated from the residual liquid phase by filtration or centrifugation and dried, and the desired article manufactured from the resulting dried particulate product, silicon dioxide, by further processing. It turns out, however, that articles manufactured from silicon dioxide prepared by introducing silicon tetrachloride into an excess of water contain many bubbles.

German AS No. 1 596 839 discloses a method of manufacturing shapes out of glasses with two or more components, wherein one of the major components of the glass is hydrolyzed in the form of a liquid or dissolved organic composition and gelled. The gel is dried, preliminarily annealed at 1230° C., finely divided, and annealed again at 1600° C., resulting in a massive shape.

U.S. Pat. No. 4,278,632 discloses a method of manufacturing vitreous pieces from silicon dioxide and titanium dioxide. Silicon alkoxide and titanium alkoxide are hydrolyzed into a gel that is shaped as desired, dried, and sintered below the softening point into a monolithic glass piece. The sintered material is then divided into fine particles of glass, which are then processed into difficult-to-melt glass pieces.

SUMMARY OF THE INVENTION

The object of the present invention is to provide a method of manufacturing articles of extremely pure low-porosity synthetic silicon dioxide, whereby the particulate silicon dioxide will have a bulk density as close as possible to that of a natural particulate silicon dioxide like granulated quartz.

This object is attained in accordance with the invention in a method of manufacturing articles of extremely pure synthetic silicon dioxide, wherein extremely pure silicon tetrachloride is introduced while being stirred into an excess of extremely pure water, the resulting hydrolysis product is dried, and the desired article manufactured from the resulting dried particulate product by further processing, characterized in that the particular ratio of silicon tetrachloride to water selected for the mixture results in a hydrolysis product in the form of a gel, hydrochloric acid is distilled out of the gel, the gel is preliminarily dried into an initial product at 100° to 1000° C., the initial product is milled into a fine granulate at room temperature, a fraction with a particle size of 40 to 1000 μm is screened out of the milled granulate, and the screened-out granulate fraction is dried while being slowly heated to no more than 1400° C. into a particulate product that can be further processed into the desired articles.

It is practical for the gel to be agitated or circulated while it is being preliminarily dried and/or the screened-out granulate fraction to be agitated or circulated while it is being dried.

It is also practical to preliminarily dry the gel at 300° to 700° C.

It is also practical to screen a granulate fraction with a particle size of 40 to 600 μm out of the milled granulate. Granulate fractions of these particle sizes turn out to be especially satisfactory for processing into quartz-glass blanks as can be done by introducing the granulate fraction into the flame of an oxygen-hydrogen burner.

Hydrolysis is carried out in a practical way in the method in accordance with the invention in a vitreous-silica vessel that has been glazed on the inside. This prevents the hydrolysis product from getting contaminated. The high infrared permeability of vitreous silica also allows the hydrochloric acid to be distilled out of the hydrolysis product in the same vessel by positioning a source of infrared radiation at its periphery.

The milled granulate can also be preliminarily and finally dried in a practical way in vessels of vitreous silica or quartz glass, preventing to the greatest extent possible contamination of the synthetic silicon dioxide that is to be further processed.

A rate of about 100 C. per hour has turned out to be practical for heating up the milled granulate. As soon as it rises to about 1000° C., that temperature is maintained for a few hours and is then increased slowly to 1200° C., where it is also maintained for a few hours. The milled granulate is then cooled relatively rapidly, over a few hours, to room temperature, at which point it can be further processed into the desired quartz-glass articles.

The method in accordance with the invention results in a low-porosity, extremely pure, fine-grained, synthetic silicon dioxide with a bulk density that is almost identical to that of natural particulate silicon dioxide and is extremely useful for processing into low-porosity extremely pure articles of quartz glass.

The method in accordance with the invention will be further described in the example hereinbelow and with reference to the saccompanying drawings, wherein.

Figure 1:
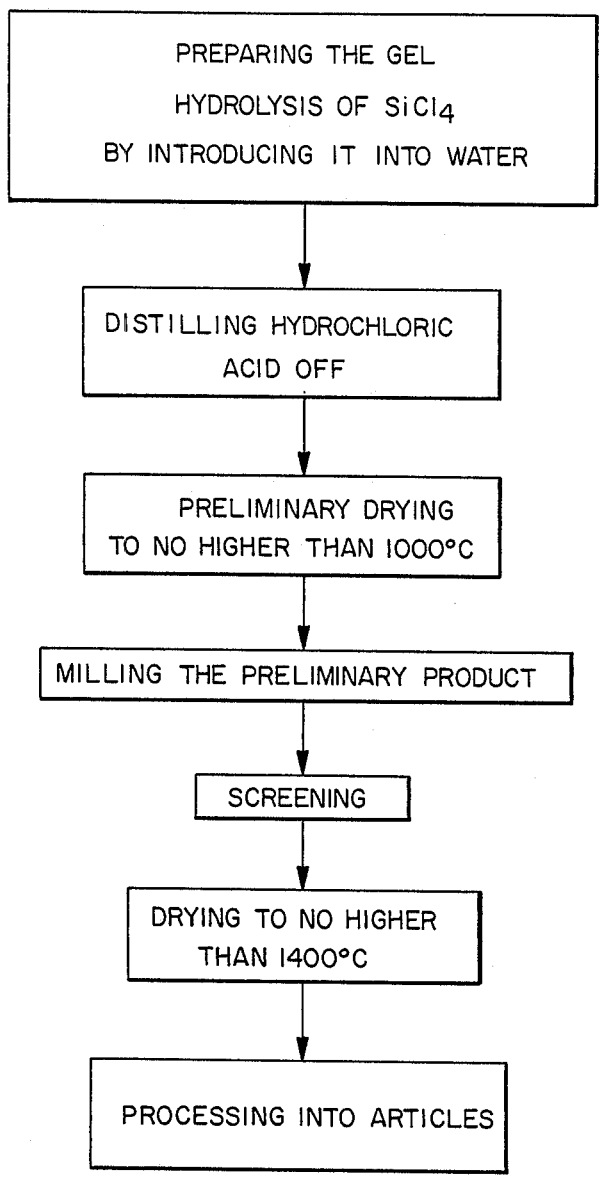
FIG. 1 is a flow sheet of the process.
Figure 2:
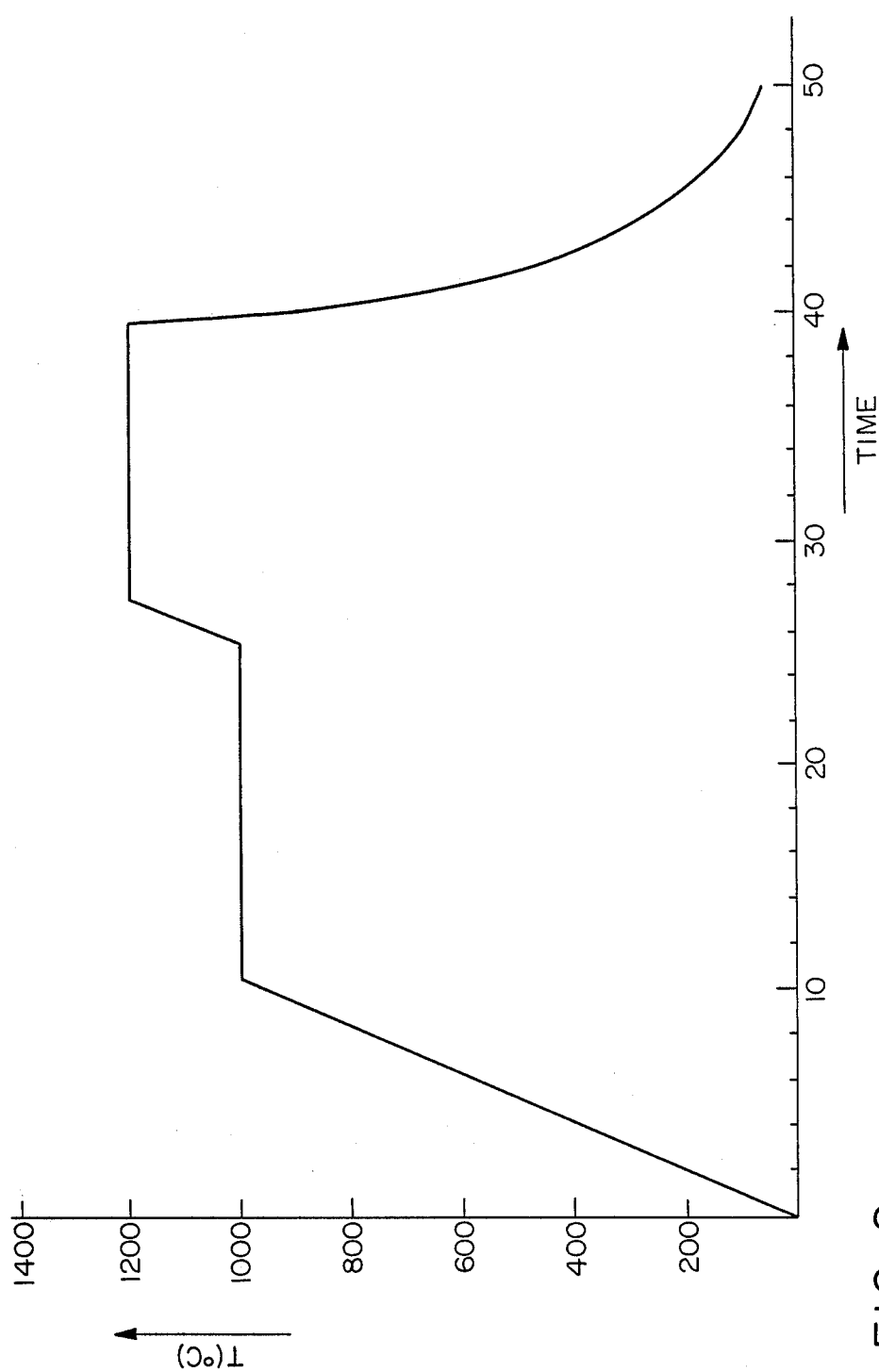
FIG. 2 is a plot of temperature versus time for heating the milled, screened silica.

EXAMPLE 250 l of extremely pure deionized water were placed in a vessel of vitreous silica with a glazed inner surface. 27.6 l of extremely pure liquid silicon tetrachloride was added to the water through a metered pump and while being stirred over the course of about 1 hour. A silicic-acid sol occurred. The total mass then solidified into a silicic-acid gel. The hydrochloric acid in the gel was distilled out by heating the vitreous-silica vessel from outside with commercially available sources of infrared radiation. Once most of the hydrochloric acid had been distilled off, about 57 kg of moist silicon dioxide was obtained. This was transferred to an oven clad in a cylinder of vitreous silica, where it was preliminarily dried for about 8 hours at 600° C. The cylinder of vitreous silica was slowly rotated during the preliminary drying to circulate the silicon dioxide. The weight of the resulting initial product was 14.5 kg. The initial product was cooled to room temperature, milled, and screened, resulting in a granulate fraction in which more than 80% of the particles ranged in size from 63 to 250 μm. This fraction was then stirred and dried in a vessel of quartz glass, maintaining the temperature-over-time curve illustrated in FIG. 2. During this drying process, the granulate fraction decreased about another 5% in weight. The resulting fine-grained product, with a bulk density closely approximating that of natural particulate silicon dioxide was then processed into a quartz-glass blank by introducing it into the flame of an oxygen-hydrogen burner of the type known from U.S. Pat. No. 4,368,846 for example.

The processing of the fine-grained product obtained in accordance with the invention into articles of extremely pure synthetic silicon dioxide is naturally not restricted to the manufacture of quartz-glass blanks in an oxygen-hydrogen burner. The fine-grained synthetic product in accordance with the invention is, rather, an ideal substitute for fine-grained natural silicon dioxide and can accordingly be employed in almost any application in which fine-grained natural silicon dioxide has ever been processed into articles.

Advantageously the molar ratio of silicon tetrachloride to water to produce the desired gel is from about 0.033 to 0.012:1 and preferably about 0.017 to 0.016:1.

It will be understood that the specification and examples are illustrative but not limitative of the present invention and that other embodiments within the spirit and scope of the invention will suggest themselves to those skilled in the art.

What is claimed is:

1. In the production of an article of synthetic silicon dioxide, wherein liquid silicon tetrachloride is introduced while being stirred into an excess of water to effect liquid-phase hydrolysis, the resulting hydrolysis product is dried, and the resulting dried particulate product is further processed into the desired article, the improvement which comprises employing a ratio of silicon tetrachloride to water so that the hydrolysis product is in the form of a gel, distilling by-product hydrochloric acid out of the gel, transferring the resulting silicon dioxide to an oven, preliminarily drying the silicon dioxide in said oven at 100° to 1000° C. to produce an initial product, milling the initial product into a granulate at room temperature, separating from the milled granulate a fraction with a particle size of about 40 to 1000 μm, and drying the screened-out granulate fraction while slowly heating to no more than 1400° C. to form the resulting dried particulate product that is further processed into the desired article.

2. The method according to claim 1, wherein during the drying of at least one of the silicon dioxide and the screened-out granulate fraction, the material being dried is agitated or circulated.

3. The method according to claim 1, wherein the silicon dioxide is preliminarily dried at 300° to 700° C.

4. The method according to claim 1, wherein the separated granulate fraction has a particle size of about 40 to 600 μm.

5. The method according to claim 1, wherein the separated granulate fraction is heated at a rate of about 100° C. per hour.

6. The method according to claim 1, wherein at least one of the hydrolysis, the preliminary drying and the final drying are carried out in a vessel of vitreous silica or quartz glass.

7. The method according to claim 1, wherein the hydrochloric acid is distilled out by heating the vessel containing the hydrolysis product from outside with infrared radiation.

8. The method according to claim 1, wherein the dried particulate product is introduced into the flame of an oxygen-hydrogen burner as a step in processing into the desired article.

9. The method according to claim 7, wherein during the drying of at least one of the silicon dioxide and the screened-out granulate fraction, the material being dried is agitated or circulated, the gel is preliminarily dried at 300° to 700° C., the separated granulate fraction has a particle size of about 40 to 600 μm and is heated at a rate of about 100° C. per hour, and the dried particulate product is introduced into the flame of an oxygen-hydrogen burner as a step in processing into the desired article, at least one of the hydrolysis, the preliminary drying and the final drying being carried out in a vessel of vitreous silica or quartz glass.

10. A method according to claim 1, wherein during said drying of the screened-out granulate fraction, the granulate fraction loses about another 5% in weight, as compared to the weight after the preliminary drying.

11. A method according to claim 1, wherein the molar ratio of silicon tetrachloride to water is 0.033 to 0.012:1.

12. A method according to claim 1, wherein the molar ratio of silicon tetrachloride to water is 0.017 to 0.016:1.

* * * * *

UNITED STATES PATENT AND TRADEMARK OFFICE
CERTIFICATE OF CORRECTION

PATENT NO. : 4,826,521

DATED : May 2, 1989

INVENTOR(S) : Wiechmann et al.

It is certified that error appears in the above-identified patent and that said Letters Patent is hereby corrected as shown below:

Col. 4, line 28    Delete "silicon dioxide" and substitute --gel--

Col. 4, line 30    Delete "gel" and substitute --silicon dioxide--

Signed and Sealed this

Twelfth Day of June, 1990

Attest:

HARRY F. MANBECK, JR.

Attesting Officer    Commissioner of Patents and Trademarks